United States Patent
Oberhofer et al.

(10) Patent No.: US 6,932,935 B1
(45) Date of Patent: Aug. 23, 2005

(54) METHOD AND DEVICE FOR PRODUCING A THREE-DIMENSIONAL OBJECT

(75) Inventors: Johann Oberhofer, Stockdorf (DE); Jochen Weidinger, München (DE); Thomas Mattes, Germering (DE)

(73) Assignee: EOS GmbH Electro Optical Systems, Planegg (DE)

( * ) Notice: Subject to any disclaimer, the term of this patent is extended or adjusted under 35 U.S.C. 154(b) by 364 days.

(21) Appl. No.: 10/049,305

(22) PCT Filed: Jul. 28, 2000

(86) PCT No.: PCT/EP00/07318

§ 371 (c)(1), (2), (4) Date: Feb. 6, 2002

(87) PCT Pub. No.: WO01/10631

PCT Pub. Date: Feb. 15, 2001

(30) Foreign Application Priority Data

Aug. 6, 1999 (DE) ................................ 199 37 260

(51) Int. Cl.[7] .......................... B29C 35/08; B29C 41/02
(52) U.S. Cl. ..................... 264/497; 264/101; 264/113; 425/174.4; 425/215; 425/375
(58) Field of Search .................... 264/101, 113, 308, 264/401, 497; 425/174.4, 215, 375

(56) References Cited

U.S. PATENT DOCUMENTS

| | | | |
|---|---|---|---|
| 4,863,538 A | 9/1989 | Deckard | 156/62.2 |
| 5,304,329 A | 4/1994 | Dickens, Jr. et al. | 264/497 |
| 5,482,659 A | 1/1996 | Sauerhoefer | 264/401 |
| 5,569,431 A | 10/1996 | Hull | 264/401 |
| 5,590,454 A | 1/1997 | Richardson | 29/527.4 |
| 5,622,577 A | 4/1997 | O'Connor | 156/62.2 |
| 5,658,412 A | 8/1997 | Retallick et al. | 156/272.8 |
| 5,662,158 A | 9/1997 | Caldarise | 164/456 |
| 5,846,370 A * | 12/1998 | O'Connor | 264/497 X |
| 5,876,550 A | 3/1999 | Feygin et al. | 156/264 |
| 5,932,055 A * | 8/1999 | Newell et al. | 156/245 |
| 6,007,318 A * | 12/1999 | Russell et al. | 425/215 X |

FOREIGN PATENT DOCUMENTS

| | | |
|---|---|---|
| DE | 295 06 716 U1 | 8/1995 |
| DE | 195 33 960 A1 | 3/1997 |
| WO | WO 92/08592 A1 | 5/1992 |
| WO | WO 95/34468 A1 | 12/1995 |
| WO | WO 00/21673 A1 | 4/2000 |

* cited by examiner

*Primary Examiner*—Leo B. Tentoni
(74) *Attorney, Agent, or Firm*—George W. Neuner; Edwards & Angell LLP

(57) ABSTRACT

A process is provided for producing a three-dimensional object having the steps forming the object (3) in a container (1, 200) arranged within a process chamber (100) on a carrier (4) which can be displaced in the container by sequential selective solidification of layers of a pulverulent material (11) which can be solidified by the action of electromagnetic or particle radiation at positions corresponding to the cross-section of the object in the particular layer, characterised by the step of controlled removal of non-solidified pulverulent material (11) after completing the object (3).

41 Claims, 4 Drawing Sheets

METHOD AND DEVICE FOR PRODUCING A THREE-DIMENSIONAL OBJECT

The invention relates to a process for producing a three-dimensional object having the steps of forming an object in a container arranged within a process chamber on a carrier which can be displaced in the container by sequential selective solidification of layers of a solidifiable pulverulent material at positions corresponding to the cross-section of the object in the particular layer and a device for producing a three-dimensional object by sequential solidification of layers of a solidifiable powder material having a container for accommodating the object to be produced, and a carrier which can be displaced in the container.

In a process, known for example from U.S. Pat. No. 4,863,538, for producing a three-dimensional object by means of selective laser sintering, the object is produced by successive selective solidification of layers of a pulverulent material at positions corresponding to the object in the particular layer under the action of a laser beam. The objects thus produced are still hot immediately after they are completed and do not yet have their final solidity. Furthermore, the object must be freed of non-solidified powder before it may be used. Depending on application, it is also desirable or necessary to subsequently treat the objects.

A process and a device is known from U.S. Pat. No. 5,846,370. There it is proposed to construct the object in a container which is provided within a process chamber and after completing the object may be removed from the latter and may be used as a cooling device. It is known from European 0 632 761 to also solidify a container wall surrounding the object together with the object and to place this container thus formed together with the object at a separate location for cooling after the building process. It is known from European 0 289 116 to produce an object by means of laser sintering of a powder, wherein the powder layers are applied by means of a fluidised bed process. Heated or cooled gas is supplied in order to keep the object at a uniform temperature during the building process. It is known from European 0 287 657 to pass a stream of temperature-controlled air through the powder bed, in order to remove heat from the object during the building process.

It is also known from German utility model DE 29 506 716.6 to remove or to unpack an object produced by means of selective laser sintering manually from the non-solidified powder still surrounding the object after construction. It is known from WO 00/21673 to provide a changeable building frame for the object in a laser sintering device which can be removed quickly and simply from the laser sintering device and re-installed and hence facilitates rapid job change. A device and a process is known from U.S. Pat. No. 5,569,431, in which an object formed by means of stereolithography is automatically raised up from a bath of liquid material which can be photo-solidified. Furthermore, European 0 403 146 discloses a stereolithography device, in which a device in which the object is constructed and a subsequent treatment device are provided. A transport device for transporting the object between the two is also provided.

It is the object of the invention to provide a process and a device for producing a three-dimensional object from solidifiable powder material, with which the overall production process may be simplified, automated and/or shortened and the precision during the production of the object is improved.

The present invention provides a process for producing a three-dimensional object having the steps forming the object (3) in a container (1, 200) arranged within a process chamber (100) on a carrier (4) which can be displaced in the container by sequential selective solidification of layers of a solidifiable pulverulent material (11) at positions corresponding to the cross-section of the object in the particular layer, characterised by the step of controlled removal of non-solidified pulverulent material (11) after completing the object (3).

It also provides a process for producing a three-dimensional object having the steps forming the object (3) in a container (1, 200; 300) arranged within a process chamber (100) on a carrier (4) which can be displaced in the container by sequential selective solidification of layers of a solidifiable pulverulent material (11) at positions corresponding to the cross-section of the object in the particular layer, characterised by the step of controlled cooling of the object (3) after completing.

It further provides a process for producing a three-dimensional object having the steps: forming the object (3) by sequential selective solidification of layers of a solidifiable pulverulent material (11) at positions corresponding to the cross-section of the object in the particular layer, characterised in that the object formed is automatically subjected to infiltration.

The invention also provides a device for producing a three-dimensional object by sequential solidification of layers of a solidifiable powder material having a container (1; 200) for accommodating the object (3) to be produced, a carrier (4) which can be displaced in the container, and a device (50; 500) for controlled removal of non-solidified pulverulent material (11) after completing the object (3).

Further, it provides a device for automatic unpacking and/or cooling of a three-dimensional object, which is produced by sequential solidification of layers of a solidifiable powder material, having a container (1; 200) for accommodating the object (3) to be produced, a carrier (4) which can be displaced in the container and having a device (50; 500) for controlled removal of non-solidified pulverulent material (11) after completing the object (3) and/or having a device for controlled cooling of the object formed (500; 600).

Further features and advantages of the invention can be seen from the description of exemplary embodiments using the figures.

Of the figures

Figure 1:
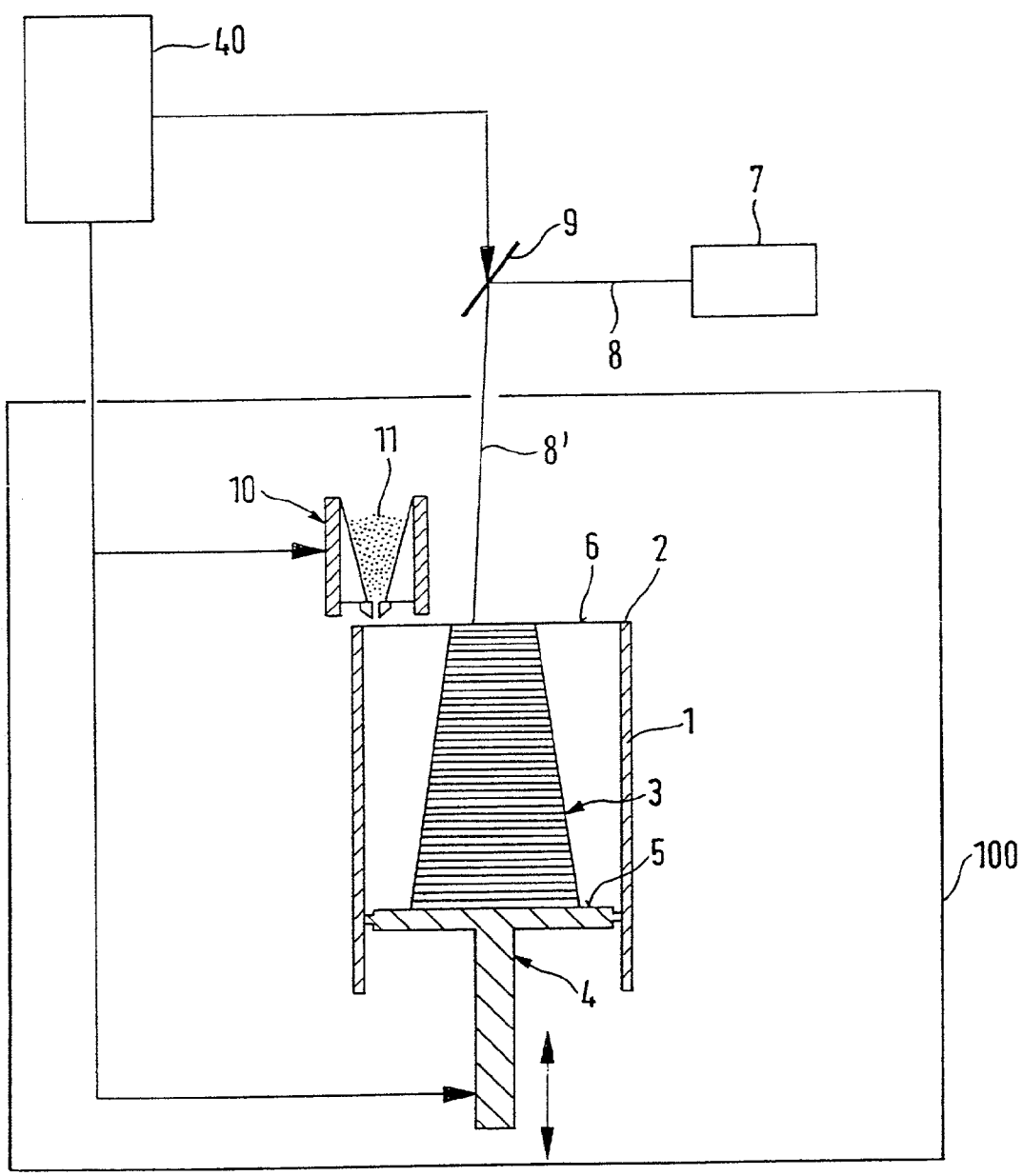
FIG. 1 shows a schematic sectional view of the device of the invention.

As can be seen in particular from FIG. 1, the device for producing a three-dimensional object has a container open at the top or building container 1 having an upper rim 2. The cross-section of the container 1 is greater than the largest cross-sectional surface area of an object 3 to be produced. A carrier 4 for supporting the object to be formed having an essentially flat surface 5 facing the upper rim 2 is provided in the container 1. The carrier 4 can be moved up and down in the container 1 in vertical direction by means of a drive indicated schematically in FIG. 1. The upper rim 2 of the container 1 defines a working plane 6.

The container 1 is releasably attached in a process chamber 100, so that it can be removed from the process chamber 100 together with the object 3 formed therein.

A radiation device in the form of a laser 7, which emits a directed light beam 8, is arranged above the working plane 6. A deflecting device 9 is provided, for example as a system of galvanometer mirrors, by means of which the light beam 8 as deflected beam 8' can be deflected to each required position of the working plane 6.

A coater 10, for applying a layer of a powder material 11 to be solidified to the carrier surface 5 or a layer which is solidified in the end, is provided. The coater 10 can be moved back and forth over the working plane 6 by means of a schematically indicated drive from a first end position on one side of the container 1 to a second end position on the opposite side of the container 1.

A control device 40 is also provided, by means of which the drive to set the position of the carrier 4, the drive for moving the coater 10 and the drive for adjusting the deflecting device can be controlled in coordinated manner or independently of one another.

Figure 2:
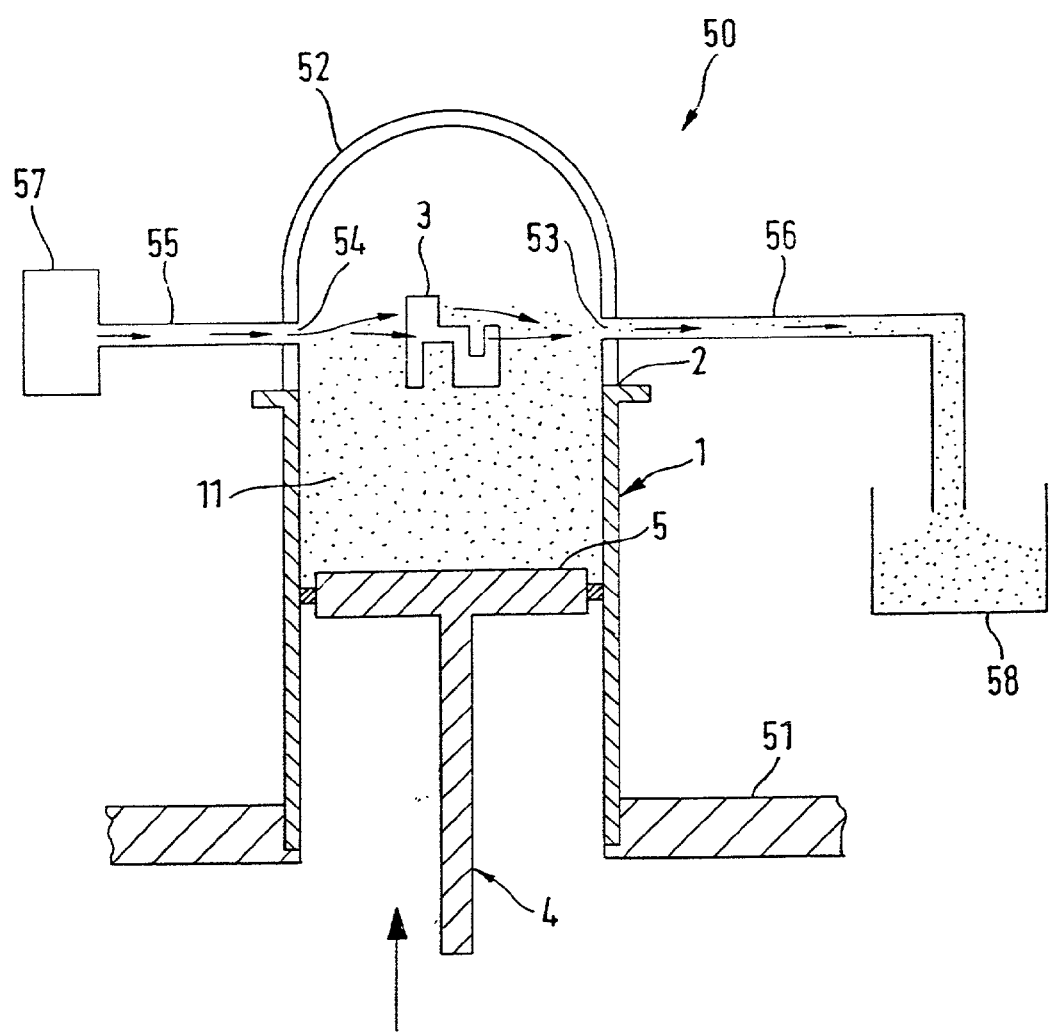
FIG. 2 shows a schematic sectional view of a detail of the device according to a first embodiment of the invention.

In a first embodiment of the invention shown in FIG. 2, the device for producing the object has a device 50 preferably arranged outside the process chamber 100 for controlled removal of the complete object from the container 1. The device 50 has a mounting 51 shown only schematically, in which the container 1 can be inserted and is held, after it is removed from the process chamber. The device 50 also has a drive indicated schematically in FIG. 2 for upward and downward movement of the carrier in the device 50. The drive is designed such that the carrier may be moved at an adjustable rate continuously or stepwise against the upper rim 2 of the container. Furthermore, the drive is designed so that the carrier 4 may be lowered again after it has reached its uppermost position.

A covering 52 sealing the container 1 from the surroundings at its open side is also provided in the form of a dome-like hood, which rests with its lower rim on the upper rim 2 of the container 1. The covering 52 can be placed on the container and a seal is provided between the upper rim 2 of the container 1 and the covering, by means of which seal a hermetic seal to the atmosphere is guaranteed. The covering has two openings 53 and 54 opposite one another which are provided at a predetermined distance from the lower rim of the covering 52. The openings 53, 54 are in each case connected to a supply pipe 55 or a removal pipe 56 for supplying a compressed gas or for removing the gas and powder particles fluidised by the gas stream. The supply pipe 55 is connected to a device 57 for supplying a gaseous medium preferably with a compressed air source 57. The removal pipe 56 is connected to a collection container 58 for removed powder material. The openings 53 and 54 in the covering 52 are arranged such that when the compressed air source 57 is connected, a gas stream flowing essentially tangentially over the upper rim 2 of the container is produced. The compressed air source 57 can be adjusted so that the strength of the air stream can be controlled. Furthermore, the temperature of the gaseous medium can be controlled so that a temperature required for cooling can be set.

In the process of the invention, the object is initially produced in known manner on the carrier 4 within the container 1 in the process chamber 100. Hence, the carrier 4 is first moved to the highest position, in which the carrier surface 5 lies at a distance of one layer thickness of the first layer to be applied below the upper rim 2 of the container 1. The coater 10 is then moved over the working plane 6 and a first layer of powder 11 to be solidified is applied. The deflecting device 9 is then controlled such that a region of the powder material corresponding to the cross-section of the object in this layer is solidified by the laser beam 8. The carrier 4 is then lowered and a new layer applied and likewise again solidified. These steps are repeated so often until the object 3 is completed. Plastic powder, such as for example polyamide powder, metal powder, ceramic powder, plastic-coated sand or combinations thereof, is used as powder material 11, depending on the area of application.

The container is then removed from the process chamber 100 together with the object 3 formed therein and introduced into the device 50 for unpacking the object 3. The carrier 4 is thus situated within the container 1 in its lowest position. Powder material 11 which is not yet solidified is situated between the object 3 formed and the container wall. When using plastic powder, the object 3 is typically still hot immediately after being completed and has not yet reached its final solidity. For gentle unpacking and cooling of the object, the covering 52 is now placed on the container 1 and the compressed air source 57 is connected. The carrier 4 is then moved upwards either continuously at an adjustable rate or stepwise within the container, so that a quantity of non-solidified powder is always situated above the container rim 2 and is held by the covering 52. The compressed air source 57 is adjusted so that an adequately strong air stream passes essentially tangentially over the powder surface and thus entrains non-solidified powder, which is removed through the outlet opening 53 and the removal pipe 56 and is collected in the collection container 58. As soon as the object 3 arrives within the region of the air stream passing over the surface by raising the carrier 4, it is cooled by the air stream. When the carrier 4 is in its uppermost end position, the covering 52 is removed and the object is taken out. It is thus adequately cooled. Hence, the object 3 is removed from the container 1 in predetermined manner by adjusting the temperature and the pressure of the air stream, and the moving rate of the carrier within the container in predetermined manner and the container 1 is again free for new insertion in the process chamber 100. The process has the advantage that by controlled unpacking and cooling of the object 3, sudden cooling is avoided and at the same time the non-solidified powder material is removed and cooled likewise slowly and in controlled manner, so that it has a high quality for re-use. On the other hand, the object 3 is only removed after this procedure, so that it does not have to be touched in the hot and still soft state, and thus is not exposed to deforming forces. Furthermore, cooling and unpacking outside the process chamber has the advantage that the latter is free for forming new objects.

In an alternative embodiment, a suction pump, which assists transport of the non-solidified powder, is connected to the removal pipe 56. The air may also be circulated, a connection pipe is then provided for this between the air removal pipe 56 and the air supply pipe 55, in which a filter is arranged to separate fluidised powder and air. Instead of air, a further gas, for example a protective gas, such as nitrogen, may also be used to prevent the powder, for example from oxidising. The overall device 50 may also be arranged within the process chamber 100, wherein however, the process chamber is then occupied during unpacking and cooling.

In a modification of the embodiment according to FIG. 2, instead of openings 53, 54, more than two openings are provided in different positions. The gas stream may also be directed other than tangentially to the surface. Furthermore, a device is provided to control the direction of the gas stream, for example in the form of a controllable nozzle.

Figure 3:
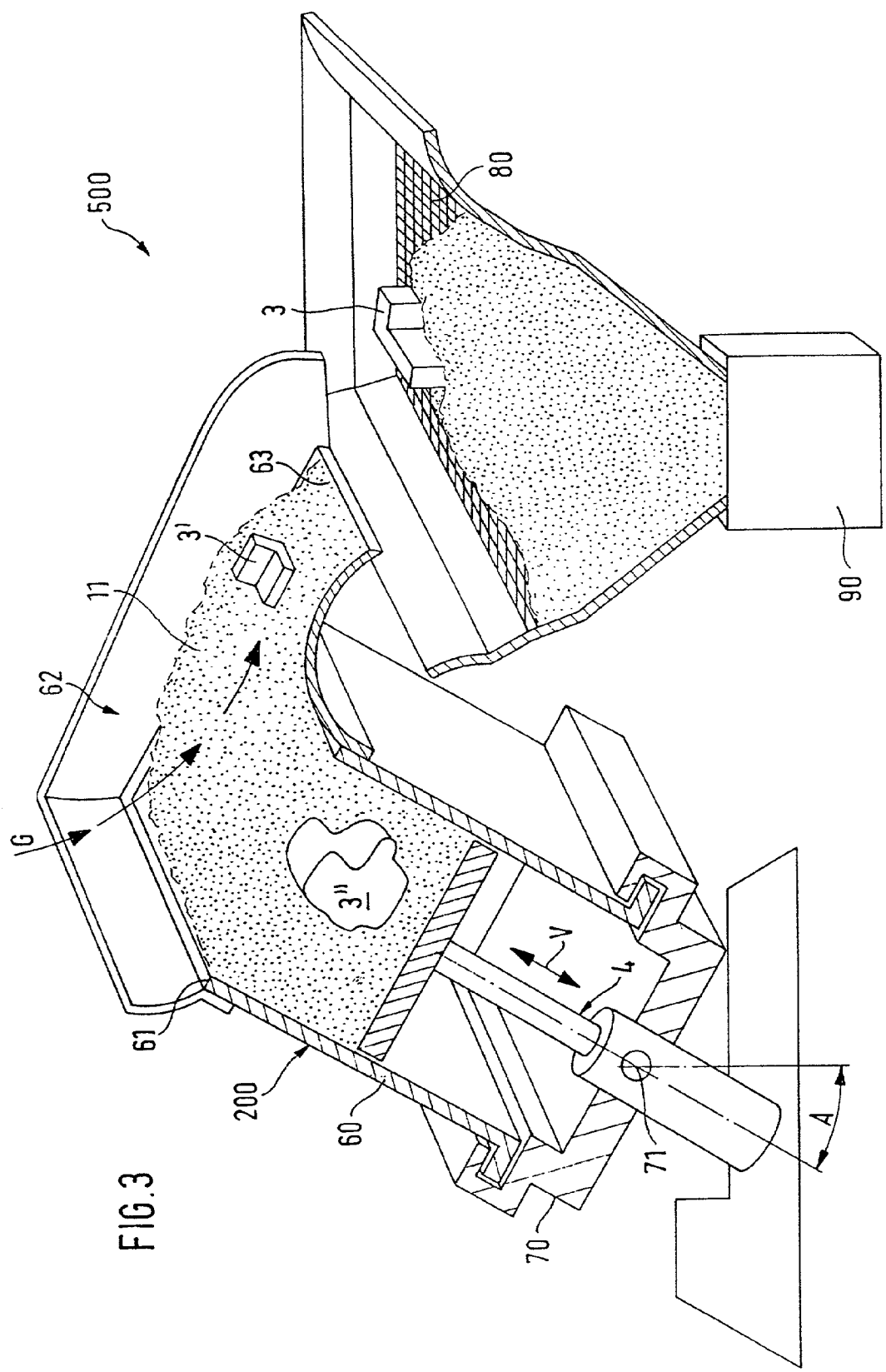
FIG. 3 shows a schematic sectional view of a detail of the device according to a second embodiment of the invention.

In a further embodiment shown in FIG. 3 of an device for removing the object from the building container, the container 200 is designed such that it has a frame 60 having preferably square or rectangular cross-section, within which the carrier 4 can be moved up and down. An annular or collar-like attachment or rim 62 is provided, which can be placed on the upper rim 61 of the container frame 60 and can be removed again. The attachment 62 is designed such that it forms an overflow device, preferably in an outwardly curved overflow edge 63 or an overflow rim rounded in the region of the overflow on at least one of the four sides of the container frame 60, and projects on the other three sides beyond the rim 61 of the container frame 60, so that it forms a device at the top for preventing powder or object from falling out during movement of the carrier 4. The container 200 is held by its frame 60 in a mounting 70, which is preferably arranged outside the process chamber 100. A tilting device 71 is also provided, with which the container 200, together with its mounting 70, can be tilted in vertical direction about a predetermined and adjustable angle A, so that the displacement axis V of the carrier 4 in the container 1 is tilted by this predetermined angle A with respect to the vertical.

A sieve device 80, preferably in the form of a shaking sieve, is arranged below the overflow edge 63 of the container 1 and a collection container 90 is arranged below the shaking sieve.

In a modification of the embodiment according to claim 3, the container 1, the sieve device 80 and optionally the collection container 90 are arranged in a dust-tight and optionally gas-tight chamber in order to avoid dust and to facilitate the control of the temperature of the surroundings.

In the process according to this embodiment, first of all the object 3 is completed within the process chamber as described above. It is thus quite possible that several separate objects 3, 3', 3" are produced within the container, which are separated from one another by non-solidified powder material 11.

The container 200 is then removed from the process chamber and placed in the mounting 70 of the device 500 for unpacking. The container 200 is tilted by means of the tilting device 71 such that the axis V of the carrier 4 has a predetermined angle A to the vertical in the direction of the sieve or collection device 80. The carrier 4 is then raised continuously or stepwise, so that non-solidified powder material 11 is pushed over the overflow edge 63 and then falls on the shaking sieve 80. The mesh width of the sieve 80 is selected such that non-solidified powder may be sifted off and collected and transported away for re-use in the collection container 90. The object or objects formed are also pushed over the overflow edge 3 by the pressure of the following powder material pushed over the overflow edge 63 by the carrier 4 moving upwards and collected in the shaking sieve 80, from where they may then be removed after sifting off the non-solidified powder material. The tilting angle A may be changed, for example increased, during raising of the carrier 4, so that the powder and the objects may be pushed completely from the container over the overflow edge 63. The container 200 does not necessarily have to be tilted. Controlled unpacking, that is the controlled removal of non-solidified powder material, is crucial.

In this embodiment, it is also possible to provide a cooling device, for example in the form of an air or gas stream G passing along the powder surface, as a result of which objects emerging on the powder surface and the powder itself are cooled.

A combination of the embodiments shown in FIG. 2 and FIG. 3 for the device for unpacking are also possible. Overflow of the powder over the edge 63 may be assisted, for example by compressed air or by a vibrator provided on the overflow edge, the container or the carrier.

In a further embodiment, a device is provided, with which the non-solidified powder is removed mechanically in controlled manner. Such a device may be formed, for example by one or more brushes, by means of which non-solidified powder is conveyed away from the surface during the upward movement of the carrier in the container, and optionally powder residues adhering to the object are removed. The mechanical device for removing the powder may also be used for assisting powder removal during sieving.

Moreover, the invention is not restricted to the use of a gas stream for removing non-solidified powder material. It is also possible to use a different fluid medium instead of the gas stream, for example a gas/powder mixture, a liquid or a liquid/powder mixture. By using a suitable fluid medium, it is possible to treat the surface of the component at the same time as removing the powder, for example to bring about smoothing by means of a gas/powder stream or hardening by means of reactive gases. Such a subsequent treatment of the component may take place at the same time and automated with the removal of powder in the device for removing the object from the container or after powder removal.

Both the embodiment according to FIG. 2, and that according to FIG. 3 or combinations of the same may also have additionally a temperature control device for controlling the temperature of the fluid medium or of the gas stream and/or the surrounding atmosphere. In a step for controlling temperature for controlled cooling of the object formed, the ambient temperature corresponds initially to the object temperature and is then slowly reduced during sieving.

Figure 4:
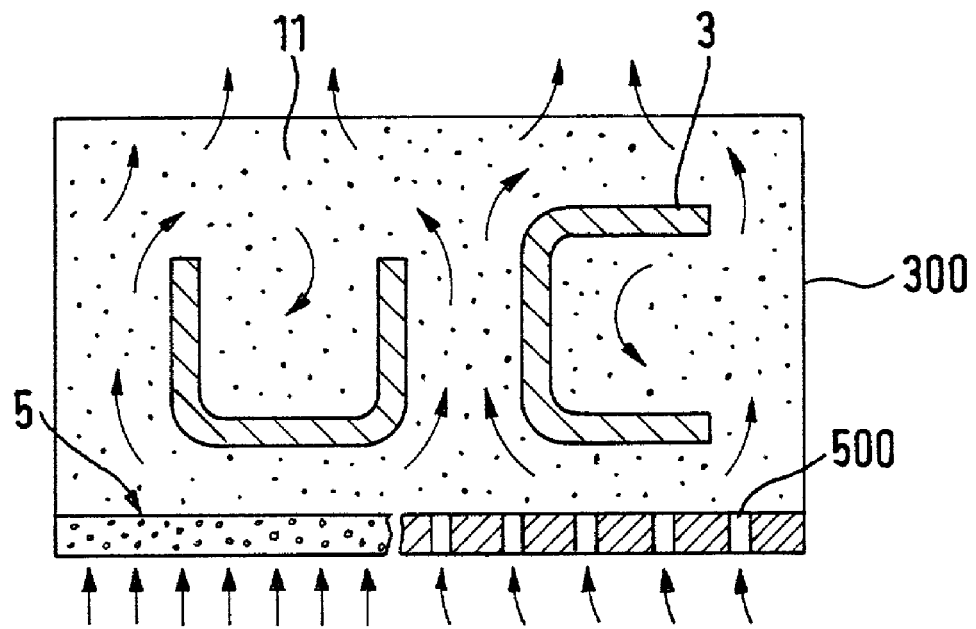
FIG. 4 shows a schematic sectional view of a detail of the device according to a further embodiment of the invention.

In a further embodiment, which is shown in FIG. 4, the carrier surface 5, also designated as building platform, on which the object is constructed in a container 300, is designed to be porous, as shown in the left-hand half of FIG. 4, or equipped with openings 500, as shown in the right-hand half of FIG. 4. A gas, for example air, which produces a type of fluidised bed and which loosens the powder 11 surrounding the object, is blown in from below through the porous building platform or the openings. Compactions or lumps which possibly exist are thus loosened, which facilitates unpacking, The direction, flow, rate and temperature of the gas can be controlled individually or in combined manner. Hence, the temperature of the whole powder bed, including the object, may be controlled. This embodiment can be combined with the exemplary embodiments described hitherto for unpacking the object. Alternatively or additionally to blowing in through the carrier surface 5, the gas may also be blown into the powder bed through the side walls of the container 300 or from the top.

Figure 5:
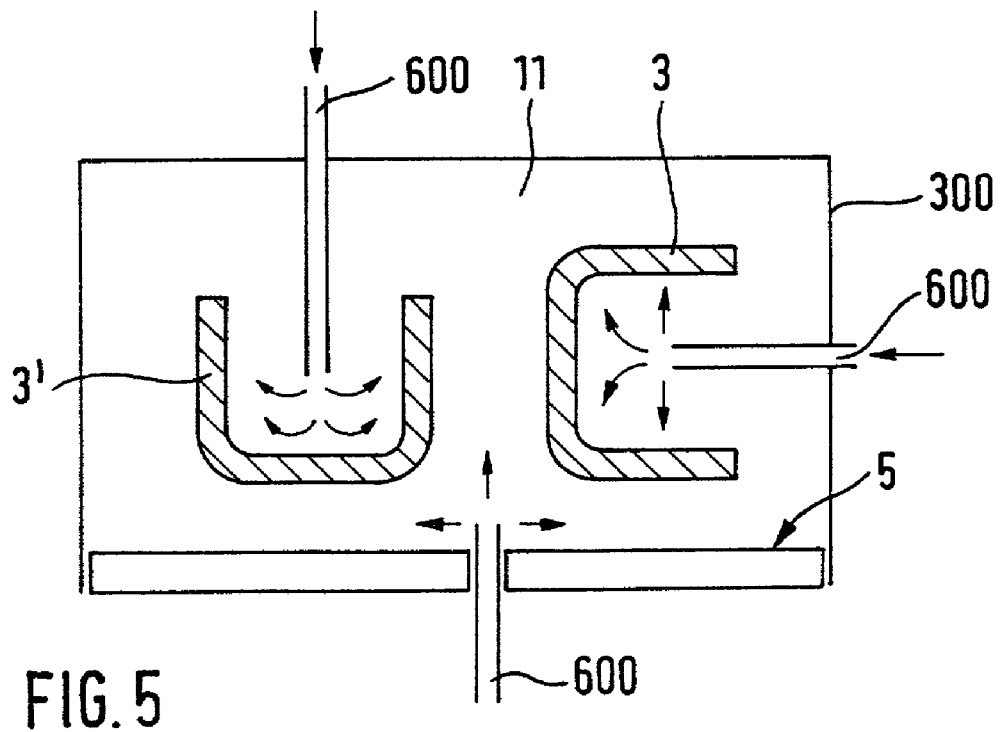
FIG. 5 shows a schematic sectional view of a detail of the device according to a still further embodiment of the invention.

FIG. 5 shows a device for controlled cooling of the object as a further embodiment of the invention. One or more supply devices 600 for gas in the form of probes or similar are passed through the building platform 5 and/or the side walls and/or the upper powder surface of the container 300, wherein the position known from CAD data and geometry of the particular object 3 is taken into account. Gas is passed at controlled temperature through the supply devices 600, so that the object may be cooled by local specific convection under defined temperature conditions. The gas also loosens the powder bed, as a result of which unpacking is facilitated.

Depending on the powder material used, the building process may be carried out, so that the object is not hot immediately after completing and therefore does not require cooling. Here too, the processes and devices described have the advantage that the object is unpacked gently and without manual work. If the object already has adequate solidity immediately after completing, instead of the continuous or stepwise raising of the carrier, the whole content of the container may be emptied straight onto the sieve or collection device, for example by opening the container. This alternative has the advantage that the entire process is accelerated, wherein the process and means described above for powder removal and cooling may likewise be used.

It is crucial that means for controlled removal of the non-solidified powder material are provided, which faciliate automatic unpacking of the object formed from the container in controlled manner without manual work.

A further embodiment of the invention consists in specifically influencing the object properties by controlled unpacking and/or cooling by means of a gas or a fluid medium, which renders manual subsequent treatment superfluous. Chemical subsequent treatment of the surface of the object formed may for example take place with the blowing-in of gas. Hence, the conventional production steps between production and use of the object can be accelerated. According to a further embodiment of the invention, the object, after non-solidified powder has been removed, is automatically subsequently treated, for example subjected to infiltration using wax or epoxy resin. The temperature of the building chamber is thus set to a suitable value necessary for infiltration via the temperature control.

The invention is also not restricted to the fact that a laser beam is used for solidifying the powder material. Instead of using a laser beam, the powder may also be solidified in a different manner, for example using other energy beams, such as for example using an electron beam or by selective adhesion, for example using binder or adhesive selectively injected from a printer head.

What is claimed is:

1. A process for producing a three-dimensional object, the process comprising the steps of:
   providing a container arranged within a process chamber and a carrier that can be moved in the container;
   forming the object on the carrier in the container by sequential selective solidification of layers of a solidifiable powder material at positions corresponding to the cross-section of the object in the particular layer; and
   controlled removing of non-solidified powder material after forming the object to automatically unpack the object in a controlled manner without manual work.

2. The process according to claim 1, further comprising, after forming the object, raising the carrier successively within the container and removing the non-solidified powder material present in the region of the container rim.

3. The process according to claim 1, wherein removing the non-solidified powder material is performed mechanically.

4. The process according to claim 3, wherein removing the non-solidified powder material is performed by brushes.

5. The process according to claim 1, wherein removing the non-solidified powder material is performed by a fluid.

6. The process according to claim 5, wherein removing the non-solidified powder material is performed by a gas stream.

7. The process according to claim 6, further comprising directing the gas stream essentially tangentially to the surface of the powder material.

8. The process according to claim 6, further comprising controlling the direction of the gas stream.

9. The process according to claim 8, further comprising directing the gas stream essentially tangentially to the surface of the powder material.

10. The process according to claim 6, further comprising blowing away the non-solidified powder.

11. The process according to claim 6, further comprising removing the non-solidified powder by suction.

12. The process according to claim 3, further comprising removing the non-solidified powder by suction.

13. The process according to claim 1, further comprising raising the carrier continuously after forming the object.

14. The process according to claim 1, further comprising raising the carrier stepwise after forming the object.

15. The process according to claim 1, further comprising removing the container from the process chamber after forming the object.

16. The process according to claim 1, further comprising tilting the container at a predetermined angle to the vertical after forming the object.

17. The process according to claim 16, further comprising removing the non-solidified powder and the object by raising the carrier in the container and successive overflowing of an edge of the container.

18. The process according to claim 17, further comprising providing a sieve device and separating the non-solidified powder and the object from one another in the sieve device.

19. The process according to claim 1, further comprising collecting the non-solidified powder and transporting away the non-solidified powder.

20. The process according to claim 1, further comprising treating the surface of the object during removal of the non-solidified powder material.

21. The process according to claim 5, further comprising controlling the temperature of the fluid.

22. The process according to claim 21, further comprising controlling the temperature of the fluid and the ambient temperature of the container.

23. The process according to claim 5, further comprising controlling the ambient temperature of the container.

24. The process according to claim 1, further comprising providing a source of electromagnetic radiation and solidifying the powder material under action of electromagnetic radiation.

25. A device for producing a three-dimensional object by sequential solidification of layers of a solidifiable powder material, the device comprising:
    a container for accommodating the object to be produced;
    a carrier that can be moved in the container; and
    an apparatus for controlled removal of non-solidified powder material after producing the object and automatically unpacking the object in a controlled manner without manual work.

26. The device according to claim 25, wherein the container has an upper rim and wherein the apparatus for controlled removal of non-solidified powder material comprises a conduit for supplying a stream of fluid essentially tangentially to the upper rim of the container.

27. The device according to claim 26, further comprising a source for providing suction for removing non-solidified powder material.

28. The device according to claim 25, further comprising a means for continuous or stepwise raising of the carrier in the container.

29. The device according to claim 25, wherein the container has an upper rim and the device further comprises an overflow region curved outwards in a region on the upper rim.

30. The device according to claim 29, further comprising means for tilting the container by a predetermined angle (A) to a vertical in the direction of the overflow device.

31. The device according to claim 30, further comprising a means for separating the non-solidified powder material from the object.

32. The device according to claim 25, further comprising means for mechanical removal of the non-solidified powder material.

33. The device according to claim 25, further comprising a chamber surrounding the container and a controller for control of the temperature surrounding the container.

34. The device according to claim 25, wherein the apparatus for controlled removal of non-solidified powder material comprises a conduit for supplying a stream of fluid to remove the non-solidified powder material and the device further comprises a controller for control of the temperature of the fluid.

35. The device according to claim 25, further comprising a conduit for supplying a stream of a gas stream to remove the non-solidified powder material.

36. A device for automatic unpacking and/or cooling of a three-dimensional object that is produced by sequential solidification of layers of a solidifiable powder material, the device comprising:
a container for accommodating the object to be produced;
a carrier that can be moved in the container; and
an apparatus for controlled removal of non-solidified powder material after producing the object and automatically unpacking the object in a controlled manner without manual work.

37. The device according to claim 36 in combination a second device for producing a three-dimensional object, the device being located and arranged inside the second device.

38. The device according to claim 37, wherein the second device is a laser sintering device.

39. The device according to claim 25, further comprising process chamber in which the container and carrier are disposed and in which the object is formed, and wherein the apparatus for controlled removal of non-solidified powder material is disposed outside the process chamber.

40. A process for producing a three-dimensional object, the process comprising the steps of:
providing a container arranged within a process chamber and a carrier that can be moved in the container;
forming the object on the carrier in the container by sequential selective solidification of layers of a solidifiable powder material at positions corresponding to the cross-section of the object in the particular layer;
controllably removing non-solidified powder material after forming the object by tilting the container at a predetermined angle to the vertical after forming the object.

41. A device; for producing a three-dimensional object by sequential solidification of layers of a solidifiable powder material, the device comprising:
a container for accommodating the object to be produced;
a carrier that can be moved in the container; and
an apparatus for controlled removal of non-solidified powder material after producing the object,
wherein the container has an upper rim and the device further comprises an overflow region curved outwards in region on the upper rim and means for tilting the container by a predetermined angle (A) to a vertical in the direction of the overflow device.

\* \* \* \* \*